US008427901B2

(12) United States Patent
Lunde et al.

(10) Patent No.: US 8,427,901 B2
(45) Date of Patent: Apr. 23, 2013

(54) COMBINED IMPULSIVE AND NON-IMPULSIVE SEISMIC SOURCES

(75) Inventors: Nils Lunde, Houston, TX (US); Antoni Marjan Ziolkowski, Edinburgh (GB); Gregory Ernest Parkes, Corsham (GB)

(73) Assignee: PGS Geophysical AS, Lysaker (NO)

( * ) Notice: Subject to any disclaimer, the term of this patent is extended or adjusted under 35 U.S.C. 154(b) by 378 days.

(21) Appl. No.: 12/653,907

(22) Filed: Dec. 21, 2009

(65) Prior Publication Data

US 2011/0149683 A1 Jun. 23, 2011

(51) Int. Cl.
*G01V 1/13* (2006.01)

(52) U.S. Cl.
USPC ................ 367/23; 367/21; 181/110; 181/111

(58) Field of Classification Search .................... 367/21, 367/23; 181/110, 111
See application file for complete search history.

(56) References Cited

U.S. PATENT DOCUMENTS

| | | | | |
|---|---|---|---|---|
| 3,351,899 | A * | 11/1967 | Luehrmann et al. | 367/23 |
| 3,744,021 | A * | 7/1973 | Todd | 367/23 |
| 4,170,002 | A * | 10/1979 | Strange | 367/23 |
| 4,472,794 | A | 9/1984 | Chelminski | |
| 4,476,550 | A * | 10/1984 | Ziolkowski et al. | 367/21 |
| 4,476,553 | A | 10/1984 | Ziolkowski et al. | |
| 4,486,866 | A * | 12/1984 | Muir | 367/39 |
| 4,658,384 | A * | 4/1987 | Dragoset et al. | 367/23 |
| 4,709,361 | A | 11/1987 | Dahlstrom et al. | |
| 4,908,801 | A * | 3/1990 | Bell et al. | 367/23 |
| 4,914,636 | A * | 4/1990 | Garrotta | 367/56 |
| 6,018,494 | A * | 1/2000 | Laws | 367/23 |
| 6,885,918 | B2 * | 4/2005 | Harmon et al. | 701/14 |
| 6,906,981 | B2 * | 6/2005 | Vaage | 367/21 |
| 7,239,577 | B2 | 7/2007 | Tenghamn et al. | |
| 7,376,045 | B2 | 5/2008 | Falkenberg et al. | |
| 7,457,193 | B2 | 11/2008 | Pramik | |
| 7,551,518 | B1 | 6/2009 | Tenghamn | |
| 2009/0086574 | A1 | 4/2009 | Scott et al. | |

FOREIGN PATENT DOCUMENTS

| | | |
|---|---|---|
| DE | 27 31 044 | 1/1979 |
| EP | 0 047 100 | 3/1982 |
| EP | 1 464 991 | 4/2003 |
| GB | 2 334 103 | 8/1999 |
| RU | 1805414 | 3/1993 |
| WO | WO 01/16621 | 3/2001 |

OTHER PUBLICATIONS

L.I. Popova, Eurasian Patent Search Report, mailing date Apr. 15, 2011.
European Patent Search Report, mailing date May 3, 2011.
Anton Ziolkowski, et al., (2000), "Simplified wavelet estimation using source-signature measurements", The Leading Edge, pp. 61-67.

* cited by examiner

*Primary Examiner* — Ian Lobo

(57) ABSTRACT

A method for seismic exploration of subsurface rock formations includes actuating an impulsive seismic energy source proximate the rock formations. A non-impulsive seismic energy source is actuated. A near field waveform of each of the impulsive and non-impulsive seismic energy sources is detected. A far field waveform of the combined output of the impulsive and non-impulsive seismic energy sources is determined from the near field waveforms. An impulse response of the subsurface rock formations is determined by deconvolving the far field waveform with detected seismic signals.

6 Claims, 2 Drawing Sheets

10 12 14 24 16 18 22 27 20 20 20 20 28 28 28 28 28 28 28 28 28 11 25 26 29 30 32 34

COMBINED IMPULSIVE AND NON-IMPULSIVE SEISMIC SOURCES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More specifically, the invention relates to seismic energy sources for marine surveying that have enhanced low frequency energy output.

2. Background Art

Marine seismic surveying includes deploying a seismic energy source in a body of water, actuating the source and detecting seismic energy reflected from acoustic impedance boundaries in rock formations below the water bottom. A typical seismic energy source used in marine seismic surveying is an air gun array. Air gun arrays include a plurality of individual air guns, each of which is connected to a source of compressed air or gas. Each air gun includes a chamber to store the compressed air or gas, at a selected pressure, and a remotely operable valve to release the compressed air or gas at predetermined times. The frequency of the seismic energy generated in the water by release of the compressed air or gas is related to, among other parameters, the volume of the chamber. An example air gun is described in U.S. Pat. No. 4,472,794 issued to Chelminski.

It is known in the art that the lowest frequency of an air gun array is the reciprocal of the bubble oscillation period of the largest air gun. The modified Rayleigh-Willis formula accurately predicts the bubble oscillation period for a single air gun as follows:

$$T = K\frac{P^{1/3}V^{1/3}}{(P_0+\rho gD)^{5/6}} \tag{1}$$

where T is the bubble period, P is the air or gas charge pressure of the air gun, V is the volume of the air gun chamber, $P_0$ is atmospheric pressure, ρ is the density of water, g is Earth's gravitational acceleration, D is the depth of the air gun in the water, and K is a constant that depends on the units of measure of all the foregoing parameters.

For a particular depth D and a particular air gun chamber pressure P, the bandwidth of an air gun array may be extended at the low frequency end by increasing the chamber volume of the largest air gun. From equation (1) it is apparent that the bubble period is proportional to the cube-root of the chamber volume of the largest air gun in the array. As a practical matter, air gun arrays known in the art do not produce substantial seismic energy below about 8 Hz. While it is possible to produce air gun arrays that would produce substantial seismic energy below 8 Hz, the chamber volume of air guns capable of producing such low frequency seismic energy would be so large as to require substantial increase in the size of the source of compressed air or gas, among other practical limitations. The bubble period equation shows that it is equally possible to increase the bubble period using the same chamber volume by increasing the charge pressure. The issue with this possibility is that airguns become much more unreliable at higher charge operating pressures. Accordingly, there is a need for marine seismic energy sources that emit more energy at frequencies below about 8 Hz that would not require increased volumes or pressures of compressed air or gas.

SUMMARY OF THE INVENTION

A method for seismic exploration of subsurface rock formations according to one aspect of the invention includes actuating an impulsive seismic energy source proximate the rock formations. After a selected time delay, a non-impulsive seismic energy source is actuated. A near field waveform of each of the impulsive and non-impulsive seismic energy sources is detected. A far field waveform of the combined output of the impulsive and non-impulsive seismic energy sources is determined from the near field waveforms. An impulse response of the subsurface rock formations is determined by deconvolving the far field waveform with detected seismic signals.

Other aspects and advantages of the invention will be apparent from the following description and the appended claims.

DETAILED DESCRIPTION

In the most general terms, a method according to the invention includes using an impulsive seismic energy source (a source that imparts substantially all its energy into the subsurface in a single, short duration event) in combination with a non-impulsive seismic energy source (wherein the energy of each actuation is spread over a relatively long time interval rather than in a single, short duration event). The combined impulsive and non-impulsive sources are used in combination so that relatively low amplitude seismic energy at low frequencies, e.g., below about 8 Hz, emitted by the impulsive source is supplemented by low frequency seismic energy from the non-impulsive source.

Figure 1:
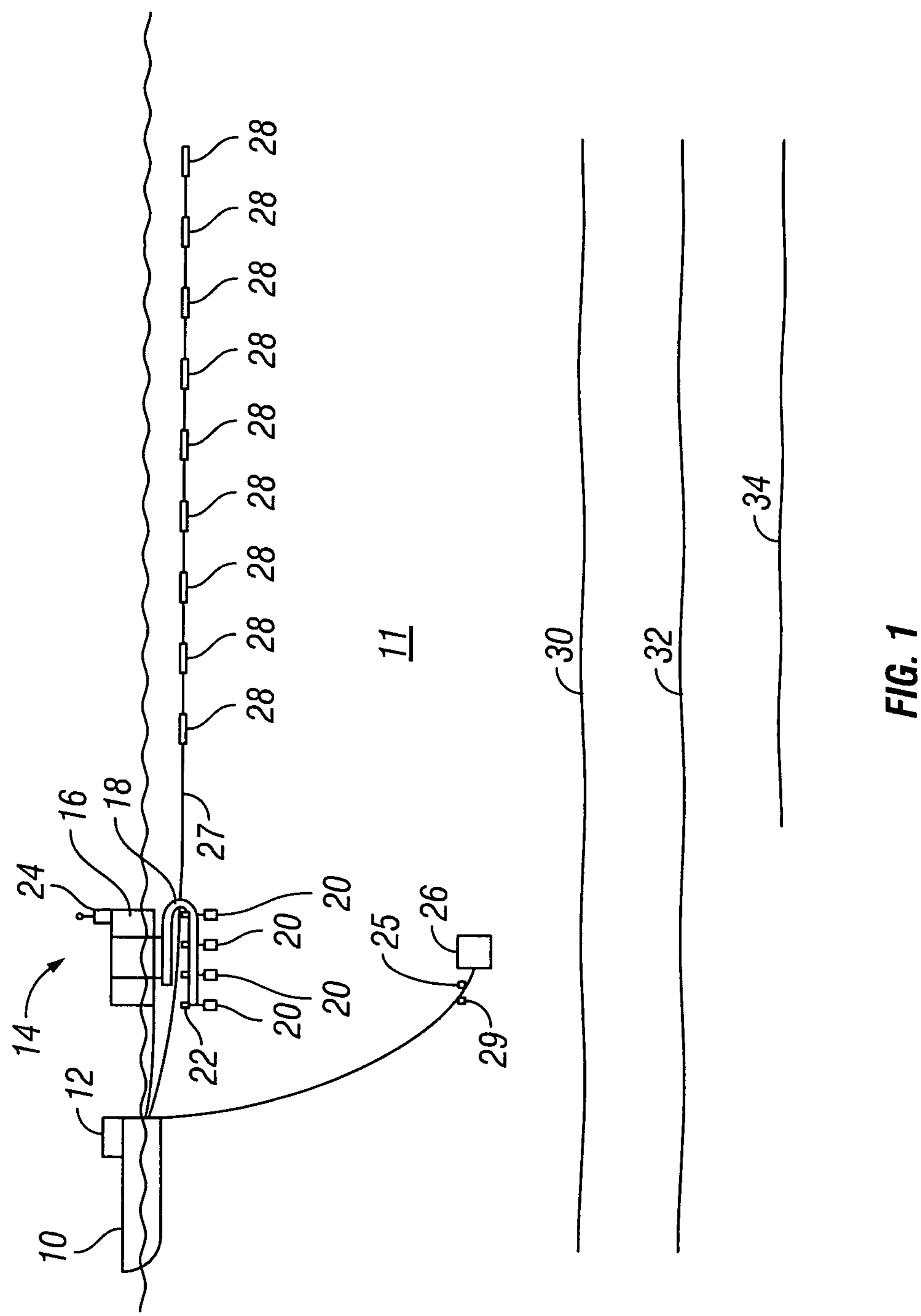
FIG. 1 shows a seismic data acquisition system including an array of air guns and a marine seismic vibrator.

FIG. 1 shows a seismic acquisition system including an impulsive seismic energy source, which in the present example is an air gun array 14, and a non-impulsive seismic energy source, which in the present example is marine seismic vibrator 26. The system is deployed in a body of water 11 such as a lake or the ocean. A seismic survey vessel 10 may be configured to tow some or all of the system components in the water 11. In other examples separate vessels (not shown) may tow some of the system components. The survey vessel 10 typically includes equipment, shown at 12 and referred to for convenience as a "recording system", which has components (none shown separately for clarity of the illustration) for performing the following functions: determining geodetic position of the survey vessel 10 and the various components of the towed system; actuating the air gun array 14 and the vibrator 26 at selected times; and recording signals detected by each of a plurality of seismic sensors 28 (explained further below) in response to seismic energy emitted by the air gun array 14 and the vibrator 26. The detected seismic energy is reflected from acoustic impedance boundaries 32, 34 in the rock formations below the water bottom 30.

The seismic air gun array 14 may include a flotation device 16 to provide buoyancy to the array 14 to cause the array 14 to move at a selected depth in the water 11. The floatation device 16 may be coupled to a frame 18. The frame 18 may be U-shaped as shown in FIG. 1. A plurality of individual air guns 20 may be suspended from or affixed to the lower part of the frame 18. The air guns 20, as is known in the art may have different charge chamber sizes so that the seismic energy emitted by the array 14 when the individual air guns 20 are actuated will have a relatively broad frequency range. A typical seismic air gun array configured on a U-shaped frame as shown in FIG. 1 is described in U.S. Pat. No. 7,457,193 issued to Pramik and commonly owned with the present invention.

Each air gun 20 has associated therewith a near field sensor 22. Each near field sensor 22 may be a pressure or pressure time gradient responsive sensor such as a hydrophone, and may be affixed to the frame 18 or disposed at another suitable position generally within one meter of the respective air gun 20. Signals generated by each near field sensor 22 are communicated to the recording system 12 for processing as will be further explained below. In some examples, each near field sensor 22 may measure pressure of the water 11, or a separate pressure sensor (not shown) may be disposed proximate each near field sensor 22 or each air gun 20 so that the depth in the water of each air gun 20 may be determined at any moment in time.

A geodetic position signal receiver 24 such as a global positioning system (GPS) satellite receiver may be affixed to the flotation device 16. The geodetic position of the flotation device 16, and, therefore, correspondingly, the geodetic position of each near field sensor 22 and each air gun 20 may be determined at any moment in time because their relative positions with respect to the flotation device are known. Signals from the receiver 24 may be communicated such as by radio link to the recording system 12.

The survey vessel 10 may also tow one or more seismic sensor streamers 27, only one of which is shown in FIG. 1 for clarity of the illustration. The seismic sensor streamer 27 is a cable or line that includes a plurality of longitudinally spaced apart seismic sensors 28. The seismic sensors 28 may be pressure or pressure time gradient responsive devices such as hydrophones, or particle motion responsive devices such as geophones or accelerometers. The seismic sensors 28 may also be substantially collocated pressure/pressure gradient and particle motion responsive sensors. One example of the latter type of sensor streamer, with collocated pressure and particle motion responsive sensors, is described in U.S. Pat. No. 7,239,577 issued to Tenghamn et al. and commonly owned with the present invention. The seismic sensors 28 may generate electrical and/or optical signals in response to detected seismic energy. The signals from the sensors 28 are communicated to the recording system 12 for making a time indexed record thereof. Typically the time index is the actuation time of the air gun array 14.

The marine vibrator 26 may be any type known in the art, and may be configured to generate seismic energy particularly in a frequency range of about 1-8 Hz. One such marine vibrator that can be configured to emit energy in such frequency range is described in U.S. Pat. No. 7,551,518 issued to Tenghamn and commonly owned with the present invention. If the foregoing type of vibrator is used, the vibrator is preferably configured so that its resonance frequencies are in the range of 1-8 Hz. Another possible device for emitting low frequency seismic energy in the frequency range of about 1-8 Hz is known as a superheterodyne transducer. One such superheterodyne transducer uses two acoustic transducers, such as piezoelectric transducers each driven at a different frequency or range of frequencies such that in the far field, the acoustic energy propagating in the water 11 and the rock formations below the water bottom 30 has a frequency that is the difference between the operating frequencies of the two transducers. An example superheterodyne seismic transducer is described in U.S. Patent Application Publication No. 2009/0086574 filed by Scott et al. Another possible transducer that may be used in some examples is a flexural disc transducer, or bender, as described in U.S. Pat. No. 4,709,361 issued to Dahlstrom et al. To increase the output of the vibrator, it may be desirable to include more than one vibrator, transducer or superheterodyne transducer in a common housing or module such as shown in FIG. 1.

The marine vibrator 26 has associated therewith and mounted at a suitable position generally within one meter of the vibrator 26 a near field sensor 29, such as a hydrophone. In the example shown in FIG. 1, the marine vibrator 26 may be towed at a different, typically greater depth in the water 11 than the air gun array 14. The vibrator 26 may have associated therewith a position determination device 25 such as an acoustic range detector. The position determination device 25 may, for example, detect acoustic signals transmitted from several different locations (e.g., along the streamer 27, along the air gun array 14 and from the survey vessel 10) so that the geodetic position of the marine vibrator 26 is determinable at any moment in time. A acoustic range detection system for determining position of various components of a seismic acquisition system, which may include a vibrator towed as shown in FIG. 1 and as explained above, is described in U.S. Pat. No. 7,376,045 issued to Falkenberg et al. and commonly owned with the present invention.

Figure 2:
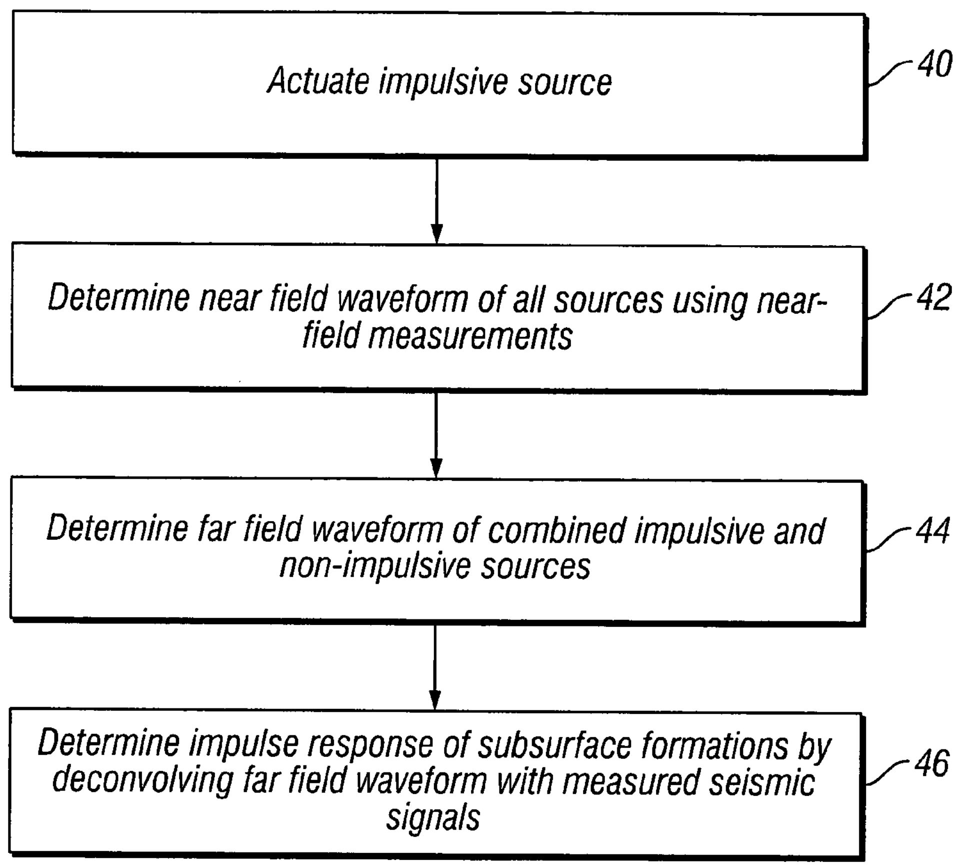
FIG. 2 is a flow chart of an example method according to the invention.

Having described a system to generate both impulsive and non-impulsive seismic signals in combination, an explanation of a method according to the invention follows with reference to the flow chart in FIG. 2. Each seismic source (i.e., each of the air guns and the marine vibrator) in an array of a number, N of individual seismic sources disposed in the water operates in the pressure field generated by each of the other seismic sources. Nevertheless, each seismic source is small in size compared with a wavelength of the seismic energy generated by each such source, and the outgoing pressure wave generated by each seismic source may be assumed to be spherically symmetric. At any point within the pressure field of the combination of seismic sources, the pressure can be considered to be a superposition of spherical pressure waves emanating from each individual seismic source. In Ziolkowski et al. (1982) the foregoing concept was proposed and was called the "notional source" concept. The foregoing publication explains that the pressure field of an N-element seismic source array can be completely determined with N independent, spaced apart pressure measurements.

In the following description, a Cartesian coordinate system may be used wherein the x-y plane is the water surface and the z-axis is perpendicular to the water surface. The coordinates of the geometric center of the marine vibrator and the center of the discharge port of each air gun are determinable (using the devices explained above with reference to FIG. 1) and may be expressed as follows:

$$(xv_i, yv_i, zv_i),\ i=1,2,\ldots,N.$$

Each of the N seismic source elements, as described in Ziolkowski et al. (1982), has a virtual source at the water surface, which surface is assumed to be flat (but not necessarily smooth). The coordinates of each virtual source may be expressed as follows:

$$(xv_i, yv_i, -zv_i),\ i=1,2,\ldots,N.$$

The coordinates of the geometric center of each of the N near field sensors are determinable using the equipment explained with reference to FIG. 1 and may be expressed as follows:

$(xh_j, yh_j, zh_j), j=1,2, \ldots, N.$

The distance from the ith source element to the jth near field sensor can be determined by the following expression:

$$r_{ij} = [(xv_i - xh_j)^2 + (yv_i - yh_j)^2 + (zv_i - zh_j)^2]^{\frac{1}{2}} \quad (2)$$

and the distance from the ith virtual source element (at the water surface) to the jth near field sensor can be determined by the expression:

$$rg_{ij} = [(xv_i - xh_j)^2 + (yv_i - yh_j)^2 + (zv_i - zh_j)^2]^{\frac{1}{2}}. \quad (3)$$

The pressure at the jth near field sensor may be represented as the superposition of the notional source pressure fields plus their reflections from the water surface which has a reflection coefficient represented by R:

$$p_j(t) - p_H = \sum_{i=1}^{N} \frac{1}{r_{ij}} s_i\left(t - \frac{r_{ij}}{c}\right) + R \sum_{i=1}^{N} \frac{1}{rg_{ij}} s_i\left(t - \frac{rg_{ij}}{c}\right), \quad (4)$$

in which $s_i$ (t) represent the notional source signatures. If there are N independent near field sensors, then there are N independent equations in the form of equation (4) which can be solved for the N unknown notional source signatures. The foregoing is described in Parkes et al. (1984). If there are more that N independent hydrophones, the additional hydrophones can be used to quality check the inversion and estimate any error (see, e.g., Ziolkowski and Johnston, 1997). If any source is fired after a selected time delay, its notional source signature will be zero before the end of the delay time. The foregoing delay can be used as a constraint in the solution of the equations. Such a solution having the foregoing constraint has been performed. See, e.g., Ziolkowski, (1987).

The near field sensors (20, 29 in FIG. 1) are preferably calibrated. If the near field sensors (20, 29 in FIG. 1) are not calibrated, their relative sensitivities should at least be determined, with output errors that depend on the geometry determined by separate experiments, as described by Parkes et al. (1984), and Ziolkowski and Johnston (1997). In an air gun array, the bubbles emitted therefrom move relative to the near field sensors (20 in FIG. 1) because the acquisition system is towed in the water, and such motion needs to be included in the calculations. See, e.g., Parkes et al. (1984) and Ziolkowski and Johnston (1997). The energy emitted by the vibrator (26 in FIG. 1), however, does not move relative to the near field sensors 20, 29.

The far field source waveform (or "signature") can be computed by superposition of the notional source waveforms and their reflections from the water surface by choosing a point P distal from the air gun array and the vibrator and having known coordinates ($x_p, y_p, z_p$). Then the distance from the ith source to P can be expressed as:

$$r_{iP} = [(xv_i - x_P)^2 + (yv_i - y_P)^2 + (zv_i - z_P)^2]^{\frac{1}{2}} \quad (5)$$

And the distance from the ith virtual source to P can be expressed as:

$$rg_{iP} = [(xv_i - x_P)^2 + (yv_i - y_P)^2 + (zv_i - z_P)^2]^{\frac{1}{2}} \quad (6)$$

The pressure waveform at P can be determined by the expression:

$$s(t) - p_P(t) - p_H = \sum_{i=1}^{N} \frac{1}{r_{iP}} s_i\left(t - \frac{r_{iP}}{c}\right) + R \sum_{i=1}^{N} \frac{1}{rg_{iP}} s_i\left(t - \frac{rg_{iP}}{c}\right). \quad (7)$$

In equation (7) there is a mixture of notional source waveforms: long duration waveforms from the above described vibrator, superheterodyne transducers or other type non-impulsive transducers; and short duration waveforms from the impulsive sources such as the above described air guns. It is possible that the far-field waveform may vary between successive actuations of the impulsive source and non-impulsive source because of variations in the depth of the air gun array and its tilt in the water, and corresponding variations in the geometry of the vibrator. It is desirable, therefore, to provide suitable measuring devices on the air gun array and on the vibrator to determine the geometry of each with respect to the water surface so that the correct coordinates enter the above equations for each actuation of the sources.

In equation (4), which refers to a single near field sensor, the amplitude of the contribution from a particular source element is inversely proportional to the distance from the center of the source to the near field sensor. This distance is of the order of meters, and can be as little as 1 meter. To solve the N simultaneous equations it is necessary for the distances between each source element and each near field sensor to be known. The quality of the solution depends to a great extent on the precision of the foregoing measurements. To estimate the far field seismic energy waveform to within 1% precision requires the geometry to be known with precision of one centimeter, and the near field sensor calibrations should be at most 0.1%.

In one example of acquiring seismic signals using the foregoing sources, for each "shot record" (i.e., a time indexed recording of the response of each seismic sensor (28 in FIG. 1) to one actuation of both the air gun array and the marine vibrator) the air gun array (14 in FIG. 1) may be actuated according to techniques known in the art. After a selected delay time in some examples, the marine vibrator (26 in FIG. 1) may then be actuated. Such actuation is shown at 40 in FIG. 2. In the present example, the delay time may be selected so that downwardly propagating seismic energy from the air gun array (14 in FIG. 1) has substantially stopped. At 42, the near field waveform of each seismic energy source may be determined using the near field sensor measurements as explained above.

The air gun array pressure waveforms may have a duration of the order of 200 milliseconds. Let the far-field waveform of the combined impulsive sources be represented by $s_1$(t), where t represents time. The non-impulsive (vibrator) source waveform, however, may have a duration of several seconds. Let the far-field signature of the combined non-impulsive source signatures be represented by $s_2$(t). If there is sufficient time delay between the start of the impulsive source signature and the start of the non-impulsive source signature using a suitable time delay as explained above, then $s_2$(t)=0 for times t less than the delay time.

The far-field waveform of the combined outputs of all sources (air gun array and vibrator) may then represented by the expression:

$$s(t)=s_1(t)+s_2(t) \quad (8)$$

which can be determined, shown at 44 in FIG. 2, from the near field sensor measurements, as described above.

The measured response at each of the seismic sensors (28 in FIG. 1) may be represented by the expression:

$$x(t)=s(t)*g(t)+n(t) \tag{9}$$

in which g(t) is the seismic impulse response of the subsurface rock formations, the asterisk * denotes convolution, and n(t) represents noise. One way to obtain an estimate of g(t) is to determine a filter f(t) that compresses s(t) to a very short duration wavelet, represented by d(t):

$$d(t)=f(t)*s(t) \tag{10}$$

That is, the filter f(t) convolved with the combined source far field waveform s(t) equals d(t). Applying the foregoing filter f(t) to the seismic sensor measurements x(t) yields the following:

$$f(t)*x(t)=f(t)*s(t)*g(t)+f(t)*n(t)=d(t)*g(t)+f(t)*n(t) \tag{11}$$

The result is to replace the long duration combined impulsive and non-impulsive far field source waveform s(t) with a short duration waveform d(t). Determining a filter as described above may be performed as explained in Ziolkowski (1987), for example. FIG. 13 the foregoing publication, in particular, shows that a long duration source waveform can be compressed to a very short source waveform. The short duration waveform may then be deconvolved, shown at 46 in FIG. 2, with the measured seismic signals x(t) to obtain an estimate of the impulse response of the rock formations in the subsurface, as shown in FIG. 1 below the water bottom 30.

The present invention may provide better images of subsurface rock formations by increasing the amount of low frequency energy, (e.g., in the frequency range of 1-8 Hz) without the need to provide very large, low frequency impulsive sources. The present invention may therefore be more practical than increasing the bandwidth of conventional impulsive seismic energy sources by increasing the size of the largest air gun in an air gun array, or by increasing the gas or air charge pressure to a value that may substantially decrease the reliability of the air gun.

References cited in the foregoing description of the invention include the following:

Ziolkowski, A. M., Hatton, L., Parkes, G. E., and Haugland, T.-A., 1984, Method of determining the signatures of arrays of marine seismic sources: U.S. Pat. No. 4,476,553.

Ziolkowski, A. M., Parkes, G. E., Hatton, L., & Haugland, T., 1982, The signature of an air gun array: computation from near-field measurements including interactions, Geophysics, Vol. 47, No. 10, 1413-1421.

Parkes, G. E., Ziolkowski, A. M., Hatton, L., & Haugland, T., 1984, The signature of an air gun array: computation from near-field measurements including interactions—practical considerations, Geophysics, Vol. 49, No. 2, 105-111.

Ziolkowski, A. M., 1987, The determination of the far field signature of an interacting array of marine seismic sources—results from the Delft Air Gun Experiment, First Break, Vol. 5, No. 1, 15-29.

Ziolkowski, A. M. and Johnston, R. G. K., 1997, Marine seismic sources: QC of wavefield computation from near-field pressure measurements: Geophysical Prospecting, 45, 611-639.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic exploration of subsurface rock formations, comprising:

actuating an impulsive seismic energy source proximate the rock formations;

after a selected time delay, actuating a non-impulsive seismic energy source;

detecting a near field waveform of each of the impulsive and non-impulsive seismic energy sources;

determining a far field waveform of the combined output of the impulsive and non-impulsive seismic energy sources using the detected near field waveforms;

detecting seismic signals in response to the combined output of the impulsive seismic energy source and non-impulsive energy source; and determining an impulse response of the subsurface rock formations by deconvolving the detected seismic signals with the far-field waveform of the combined impulsive and non-impulsive sources.

2. The method of claim 1 wherein the impulsive seismic energy source comprises an air gun array.

3. The method of claim 1 wherein the non-impulsive seismic energy source comprises a marine vibrator.

4. The method of claim 1 wherein the non-impulsive seismic energy source comprises a superheterodyne transducer.

5. The method of claim 1 wherein the time delay is selected such that downwardly propagating energy from the impulsive seismic energy source is substantially stopped.

6. The method of claim 1 wherein the far field waveform is determined by determining a notional source corresponding to each of the impulsive and non-impulsive seismic energy sources.

* * * * *